UNITED STATES PATENT OFFICE.

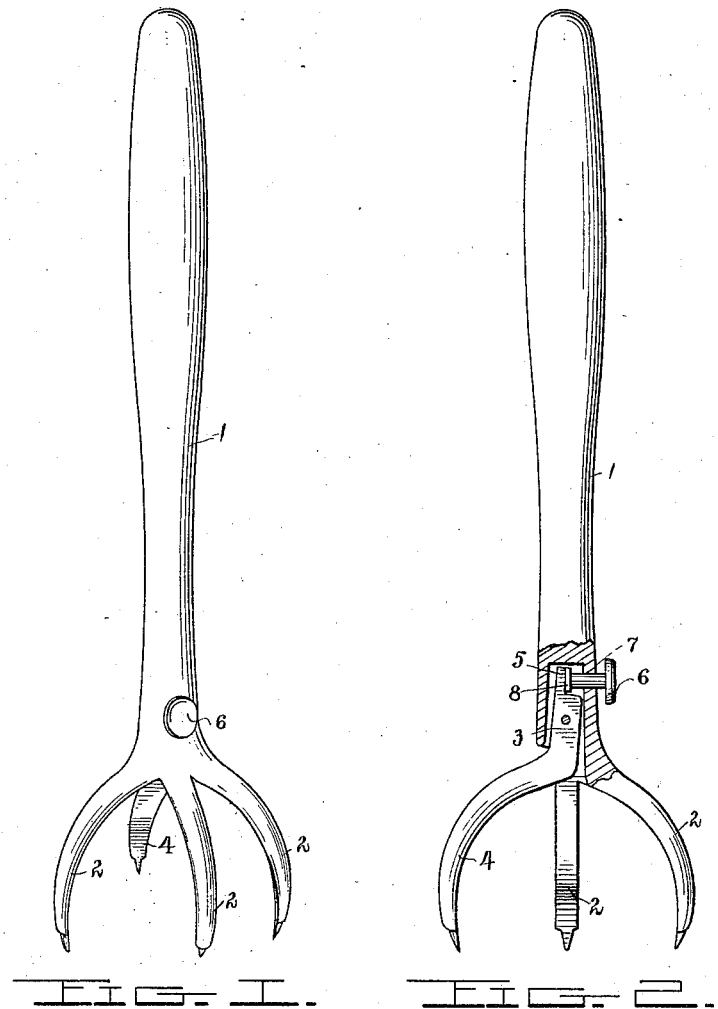

WILLIAM A. KINNEY, OF SCRANTON, PENNSYLVANIA.

EGG-HOLDER.

1,054,562.  Specification of Letters Patent.  Patented Feb. 25, 1913.

Application filed September 6, 1911. Serial No. 647,829.

*To all whom it may concern:*

Be it known that I, WILLIAM A. KINNEY, a citizen of the United States, residing at Scranton, in the county of Lackawanna and State of Pennsylvania, have invented new and useful Improvements in Egg-Holders, of which the following is a specification.

This invention relates to article holders and more particularly to egg holders.

The object of the invention is to provide a simple and efficient device of this character which will be durable and at the same time inexpensive and in which an egg can be held while the shell thereof is removed or the contents of the egg removed from the shell without danger of burning the fingers or of getting the egg upon the hand.

Further objects of the invention will appear as the following specific description is read in connection with the accompanying drawing, which forms a part of this application, and in which:—

Figure 1 is a perspective view of the device. Fig. 2 is a detail longitudinal section.

Referring more particularly to the drawing, 1 represents a handle by which the device may be manipulated. Radiating from the end of the handle are three claw-like fingers 2 and intermediate the diametrically opposite pair of fingers is a notch 3 formed in the handle and in which is pivoted a fourth claw 4 having an inner shouldered end 5 adapted to be engaged by a manipulating button 6 which passes through an aperture 7 in the handle and is provided with a headed finger engaging end 8 which prevents its removal from the handle.

In the operation of the device the fingers are placed over the egg and a button pressed which brings the finger 4 toward its diametrically opposite stationary finger, thereby clamping the egg and holding the same while the shell is removed and the contents of the same removed from the shell.

Having thus described the invention, what I claim as new is:—

A device of the class described comprising a handle, a plurality of oppositely bowed claw-like fingers arranged in opposite pairs and extending from the end of the handle and separated at quartering intervals, said handle having a notch therein between two of the fingers, one of said fingers being freely pivoted to the handle and having one end lying within the notch, a button freely slidably mounted in the handle and adapted to freely engage the end of the finger which lies within the notch so as to bring said finger toward the other fingers, and means carried by the button for preventing disconnection of the same from the handle.

In testimony whereof I affix my signature in presence of two witnesses.

WILLIAM A. KINNEY.

Witnesses:
ERWIN K. RAPP,
ISAAC IREY.

---

Copies of this patent may be obtained for five cents each, by addressing the "Commissioner of Patents, Washington, D. C."